(12) United States Patent
Hattori (10) Patent No.: US 6,779,545 B2
(45) Date of Patent: Aug. 24, 2004

(54) PRESSURE CONTROL VALVE FOR FUEL TANK

(75) Inventor: Toshio Hattori, Sagamihara (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 10/419,135

(22) Filed: Apr. 21, 2003

(65) Prior Publication Data

US 2004/0011400 A1 Jan. 22, 2004

(30) Foreign Application Priority Data

Jul. 16, 2002 (JP) ........................................ 2002-206952

(51) Int. Cl.⁷ .............................................. F16K 24/04
(52) U.S. Cl. .................... 137/202; 137/493.1
(58) Field of Search ............................. 137/202, 493.1, 137/493.8, 493.9

(56) References Cited

U.S. PATENT DOCUMENTS 5,666,989 A * 9/1997 Roetker ...................... 137/202

* cited by examiner

Primary Examiner—Gerald A. Michalsky (57) ABSTRACT

A pressure control valve for a fuel tank includes a valve chamber having the first communicating portion communicating with a canister and the second communicating portion communicating with the fuel tank; the first hollow valve member housed in the valve chamber to be vertically movable; and the second valve member housed in the first valve member to be vertically movable. A valve portion for closing the second communicating portion from the inside of the valve chamber and the first communicating hole passing through the valve portion are provided at a bottom of the first valve member. The second communicating hole is provided at an upper portion of the first valve member for communicating between the inside of the first valve member and the valve chamber.

8 Claims, 5 Drawing Sheets

PRESSURE CONTROL VALVE FOR FUEL TANK

BACKGROUND OF THE INVENTION AND RELATED ART STATEMENT

The present invention relates to an improvement of a pressure control valve to be provided in a ventilation path between a fuel tank and a canister for controlling an internal pressure of the fuel tank.

Japanese Patent Publication (Tokkai) No. 09-60744 has disclosed a pressure control valve (also called as a check valve, etc.) to be provided inside a ventilation path between a fuel tank and a canister for controlling an internal pressure of the fuel tank.

Such a conventional valve includes the first body, the second body, a positive pressure valve body, the first spring for urging the positive pressure valve, a negative pressure valve body, and the second spring for urging the negative pressure valve. That is, the conventional valve has relatively many parts, thereby requiring extra labor for assembly and making it difficult to reduce a cost.

In view of the problems of the conventional valve, an objective of the present invention is to provide a pressure control valve for a fuel tank with a minimal number of parts. The control valve opens properly a ventilation path between the canister and fuel tank when an inner pressure of the fuel tank reaches a high pressure level or a low pressure level.

Further objects and advantages of the invention will be apparent from the following description of the invention.

SUMMARY OF THE INVENTION

In order to attain the above objects, according to the first aspect of the invention, a pressure control valve for a fuel tank includes a valve chamber having the first communicating portion communicating with a canister and the second communicating portion communicating with the fuel tank; the first hollow valve member housed in the valve chamber to be vertically movable; and the second valve member housed in the first valve member to be vertically movable. A valve portion for closing the second communicating portion from the inside of the valve chamber and the first communicating hole passing through the valve portion are provided at a bottom of the first valve member. The second communicating hole is provided at an upper portion of the first valve member for communication between the inside of the first valve member and the valve chamber.

Further, the second valve member is disposed directly above the first communicating hole in a state that the second valve member is placed on a spacer portion formed around an edge of the first communicating hole so that the second valve member does not block the first communicating hole. Also, the valve portion for closing the second communicating hole from the inside of the first valve member is provided on the upper portion of the second valve member.

When an internal pressure of the fuel tank T increases due to fueling, the second valve member rises to close the second communicating hole. When the internal pressure of the fuel tank increases further and exceeds the pressure level increased by the fueling, the first valve member rises to open the second communicating portion.

With the above structure, when the internal pressure of the fuel tank is below the pressure level increased by the fueling, the first valve member closes the second communicating portion from the inside of the valve chamber by a weight of the first valve member. Also, the second valve member stays at a lower position by its own weight where the bottom of the second valve member is placed on the spacer portion formed around the edge of the first communicating hole. Accordingly, the second communicating portion communicates with the first communicating portion through the interior of the first valve member via the first communicating hole and the second communicating hole, thereby securing the air path between the canister and the fuel tank.

In other words, when the internal pressure of the fuel tank is lower than the pressure level increased by the fueling, it is possible to always create the air path between the canister and the fuel tank.

When the pressure in the fuel tank is increased to a predetermined value due to the fueling, only the second valve member rises by an upward pressure acting on the bottom of the second valve member through the first communicating hole to close the second communicating hole, so that the canister does not communicate with the fuel tank.

When the inside of the fuel tank becomes a predetermined high pressure state above the pressure level caused by the fueling, the second valve member rises by the upward pressure acting on the bottom of the second valve member through the first communicating hole to close the second communicating hole. At this time, the first valve member also rises by the pressure acting on the bottom of the first valve member through the second communicating portion to thereby open the second communicating portion, so that the gas flow can be formed between the canister and the fuel tank through the valve chamber.

According to the second aspect of the invention, a pressure control valve for a fuel tank includes a valve chamber including the first communicating portion communicating with a canister and the second communicating portion communicating with the fuel tank; a hollow first valve member housed in the valve chamber to be vertically movable; and a cylindrical second valve member housed in the first valve member to be vertically movable and having an open bottom end. A valve portion for closing the second communicating portion from inside of the valve chamber and the first communicating hole passing through the valve portion are provided at a bottom of the first valve member. The second communicating hole for communication between the inside of the first valve member and the valve chamber is provided at an upper portion of the first valve member.

The second valve member is disposed directly above the first communicating hole to close the first communicating hole. A valve portion for closing the second communicating hole from the inside of the first valve member is provided on an upper portion of the second valve member. Further, an airflow portion for communicating the inside of the second valve member and the inside of the first valve member is formed on a side of the second valve member.

When the internal pressure of the fuel tank increases due to the fueling, the second valve member rises to close the second communicating hole. When the internal pressure of the fuel tank increases further and exceeds the pressure level increased due to the fueling, the first valve member rises to open the second communicating portion.

With the structure described above, when the pressure in the fuel tank is less than the pressure level increased due to the fueling, the first valve member blocks the second communicating portion from the inside of the valve chamber by its own weight. Also, the second valve member closes the first communicating hole from the inside of the first valve member by its own weight. However, the second communicating portion communicates with the first communicating portion through the interior of the first valve member via the interior of the second valve member communicating with the first communicating hole and the airflow portion, thereby securing the airflow between the canister and the fuel tank.

In other words, when the internal pressure of the fuel tank is lower than the pressure level increased by the fueling, it is possible to always create the air path between the canister and the fuel tank.

When the pressure in the fuel tank is increased to a predetermined value due to the fueling, only the second valve member rises by the upward pressure acting on the bottom of the second valve member through the first communicating hole to close the second communicating hole, so that the canister does not communicate with the fuel tank.

When the inside of the fuel tank becomes a predetermined high pressure state above the pressure level caused by the fueling, the second valve member rises by the upward pressure acting on the bottom of the second valve member through the first communicating hole to close the second communicating hole. At this time, the first valve member also rises by the pressure acting on the bottom of the first valve member through the second communicating portion to thereby open the second communicating portion, so that the gas flow can be formed between the canister and the fuel tank through the valve chamber.

According to the third aspect of the invention, the pressure control valve for the fuel tank according to the first and second aspects of the invention further includes a lower chamber with a bottom of the valve chamber as a top wall thereof to be disposed in the fuel tank. The valve chamber communicates with the lower chamber through the second communicating portion. Further, a floating member constituting a cut valve is disposed in the lower chamber for closing the second communicating portion from the lower chamber side when the fuel flows into the lower chamber.

With the structure described above, the cut valve with a function for controlling the internal pressure of the fuel tank is constructed through the first valve member and the second valve member with the minimum number of the parts.

DETAILED DESCRIPTION OF THE PREFERRED EMBODIMENT

Hereunder, embodiments of the present invention will be described in detail with reference to the accompanying drawings.

Figure 1:
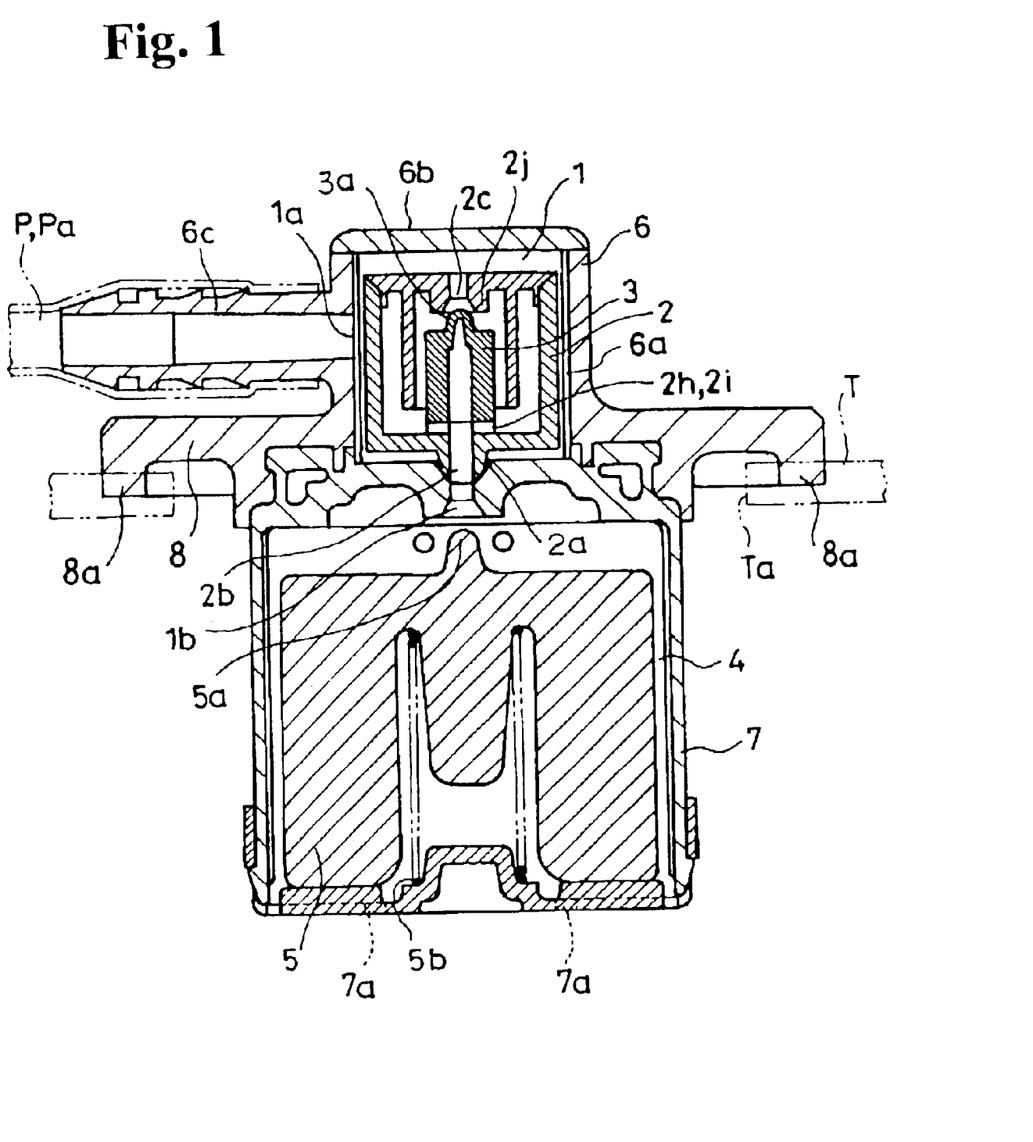
FIG. 1 is a sectional view showing an example, wherein a valve according to the present invention is applied to a cut valve.
Figure 2:
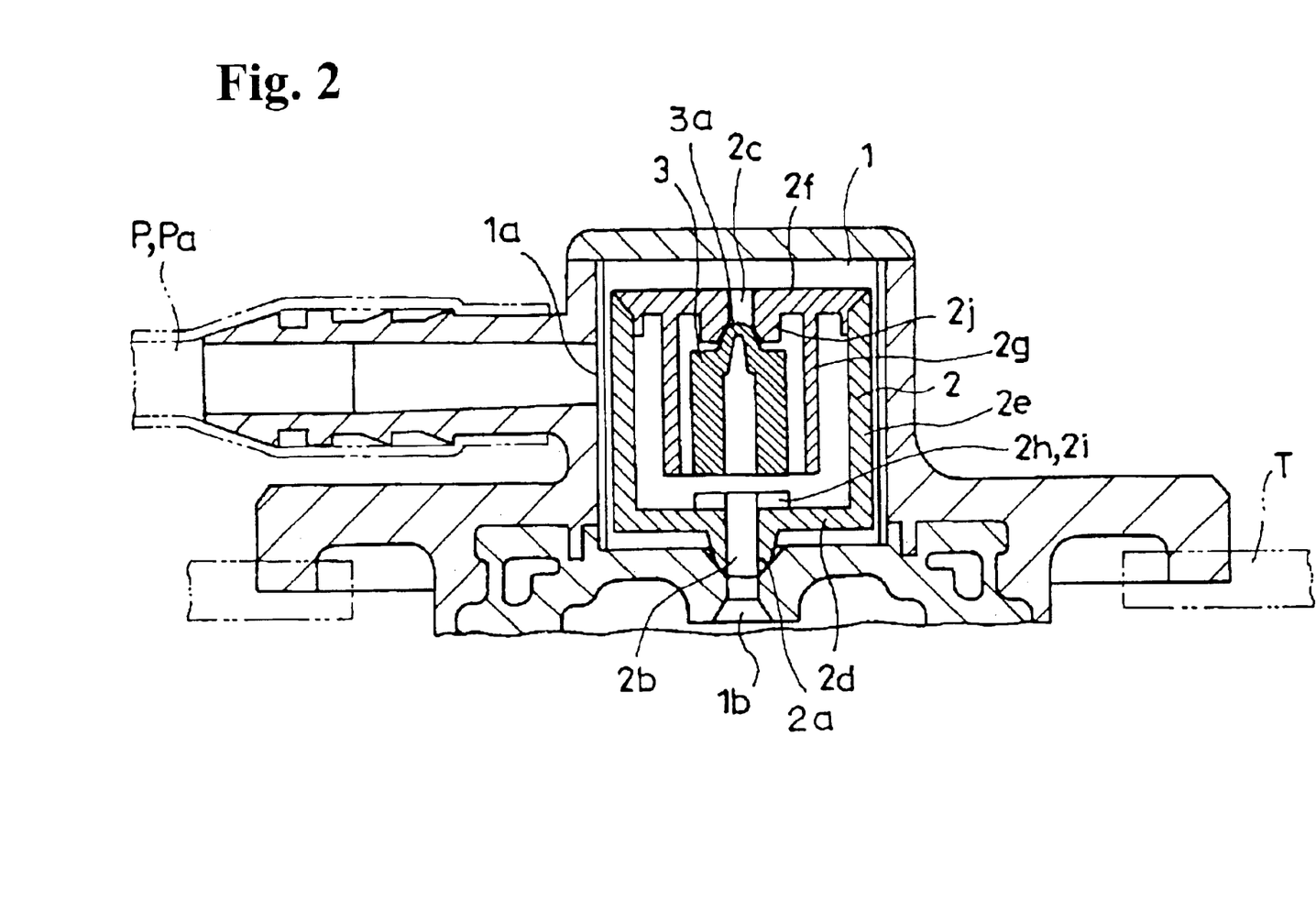
FIG. 2 is a sectional view of an essential part of the cut valve.
Figure 3:
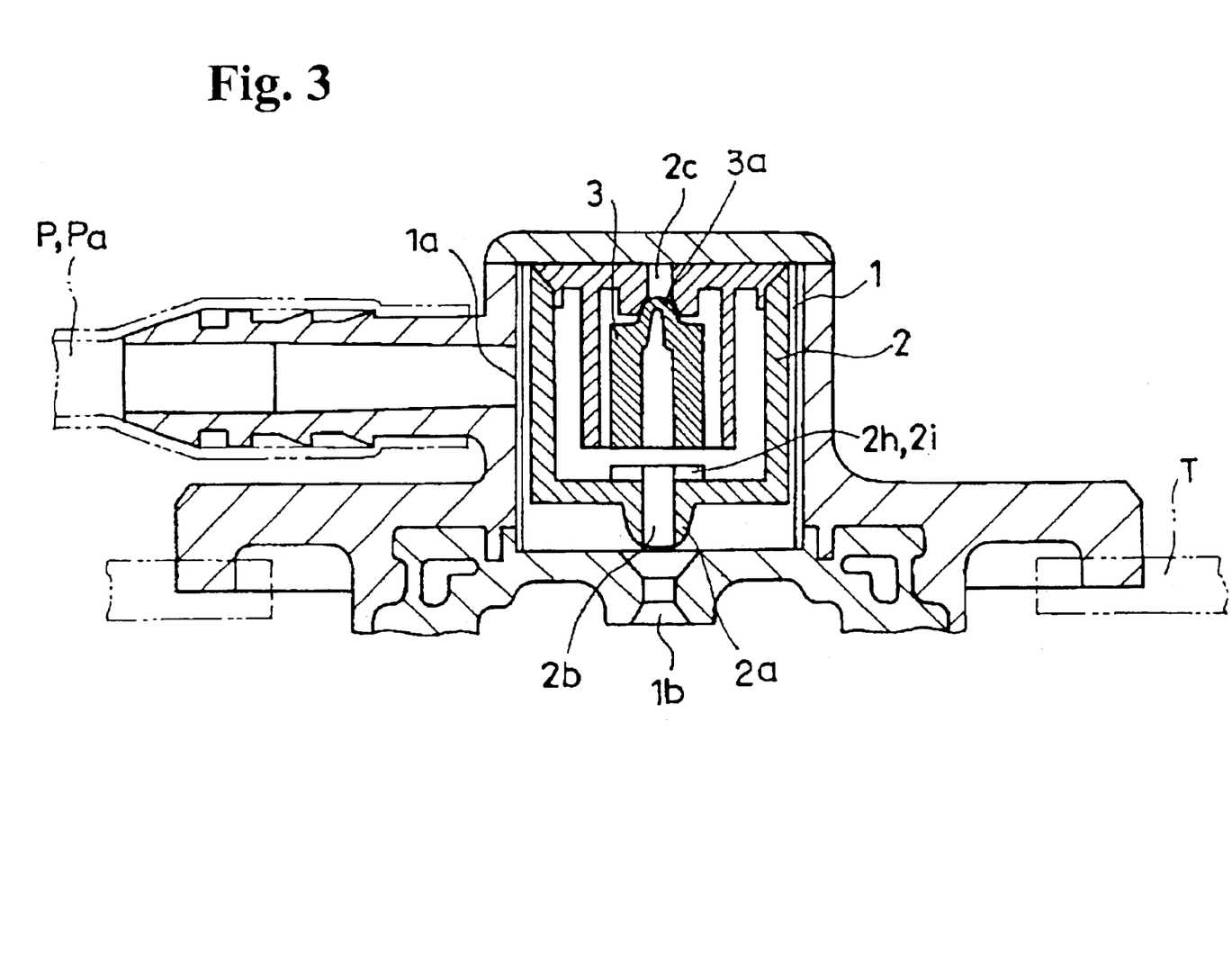
FIG. 3 is a sectional view of an essential part thereof.
Figure 4:
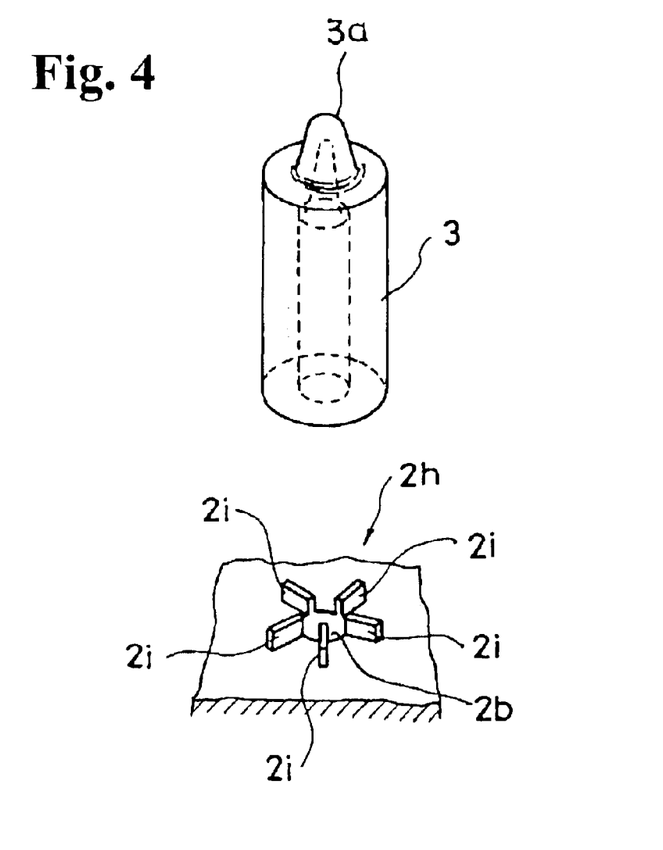
FIG. 4 is a perspective view of an essential part thereof.

Incidentally, FIGS. 1 to 3 show a structure of a cut valve using a valve according to the present embodiment. Especially, FIG. 2 shows a state wherein the second valve member 3 rises when an internal pressure of a fuel tank T increases due to fueling, and FIG. 3 shows a state wherein the first valve member 2 rises when an internal pressure of the fuel tank T further increases to a level greater than the pressure increase caused by the fueling, respectively. When the pressure in the fuel tank T decreases to a predetermined value from the states shown in FIGS. 2 and 3, the first and second valve members return to the state shown in FIG. 1. Also, FIG. 4 shows the second valve member 3 and a spacer portion 2h constituting the valve for supporting a bottom of the second valve member 3.

Figure 5:
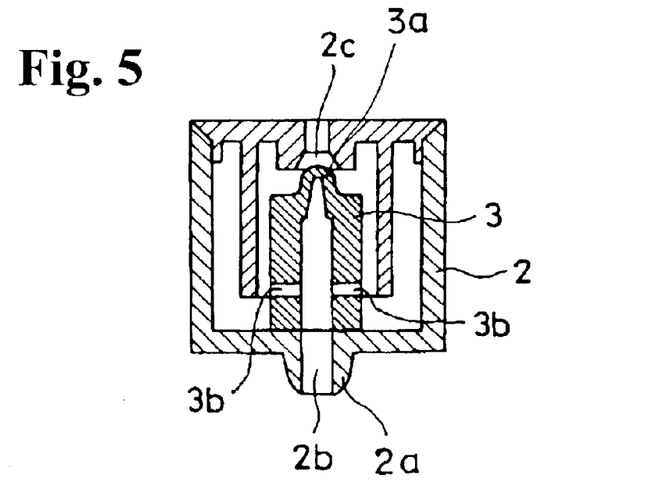
FIG. 5 is a sectional view of an essential part of a modified example of the second valve member in the structure of the cut valve as shown in FIGS. 1 to 4.
Figure 6:
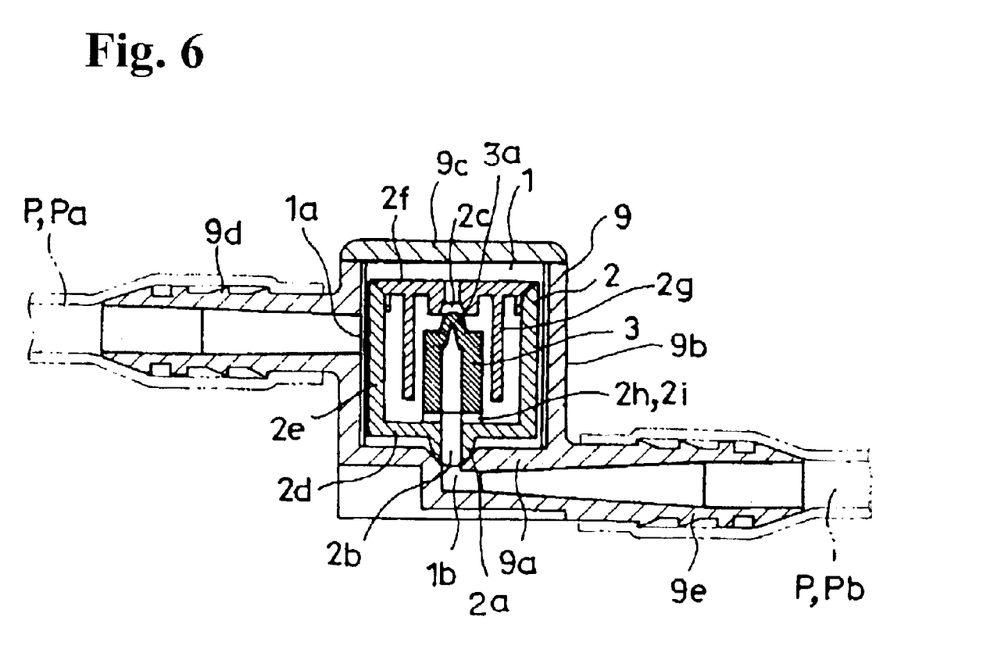
FIG. 6 is a sectional view of an example, wherein the valve according to the present invention is installed in an airflow path between a canister and a fuel tank.

FIG. 5 shows a modified example of the second valve member 3. FIG. 6 shows a structure wherein the valve according to the embodiment disposed in an airflow path P between a canister and the fuel tank T outside the fuel tank T for controlling the pressure in the fuel tank T.

The valve according to the embodiment is disposed in the airflow path P between the fuel tank T and the canister for controlling the pressure in the fuel tank T. The valve has a valve chamber 1 including a first communicating portion 1a to be communicated with the airflow path P to the canister, and a second communicating portion 1b to be communicated with the fuel tank T.

The valve has the first valve member 2 and the second valve member 3 (described later) housed in the valve chamber 1. When the pressure in the fuel tank T increases due to the fueling, only the second valve member 3 rises to close the second communicating hole 2c so that the fuel tank T does not communicate with the canister. When the internal pressure exceeds the pressure level increased by the fueling, the second valve member 3 rises to close the second communicating hole 2c, and, at the same time, the first valve member 2 rises to open the second communicating portion so that the fuel tank T communicates with the canister.

When the pressure stays at the same level, both the first valve member 2 and the second valve member 3 stay at lower positions by their own weights so that the first communicating portion 1a communicates with the second communicating portion 1b through the valve chamber 1, thereby securing the communication path between the fuel tank T and the canister.

As shown in FIG. 6, the valve as described above is typically disposed in the airflow path P between the fuel tank T and the canister outside the fuel tank T for controlling the internal pressure.

Also, as shown in FIG. 1, the valve may be attached to an attaching hole Ta provided in the fuel tank T so that the valve closes the attaching hole Ta from the outside of the fuel tank T for controlling the internal pressure.

The valve may be attached to an upper portion of a sender module (an integrated unit comprising an fueling pump, fuel gauge, suction filter, fuel filter and so on to be built in the fuel tank T), and is used as a valve for controlling the internal pressure.

The valve includes the first hollow valve member 2 housed in the valve chamber to be movable vertically, and the second valve member 3 housed in the first valve member 2 to be movable vertically. Also, on a bottom portion 2d of the first valve member 2, there are provided a valve portion 2a for closing the second communicating portion 1b from the inside of the valve chamber, and the first communicating hole 2b passing through the valve portion 2a. The first valve member 2 is provided with the second communicating hole 2c on an upper portion thereof for connecting the interior of the first valve member 2 to the valve chamber 1.

Also, the second valve member 3 is disposed directly above the first communicating hole 2b in a state that the bottom portion of the second valve member 3 is placed on a spacer portion 2h formed around an edge of the first communicating hole 2b so that the bottom portion of the second valve member 3 does not close the first communicating hole 2b. Further, a valve portion 3a is provided on an upper portion of the second valve member 3 for closing the second communicating hole 2c from the inside of the first valve member 2. The second valve member 3 rises to close the second communicating hole 2c when the internal pressure of the fuel tank T increases due to the fueling. Also, when the internal pressure of the fuel tank T exceeds the pressure level increased by the fueling, the first valve member 2 rises to open the second communicating portion 1b.

With the valve described above, when the internal pressure of the fuel tank T does not exceed the pressure level increased by the fueling, the first valve member 2 closes the second communicating portion 1b by its own weight from the inside of the valve chamber 1. The second valve member 3 stays at a lower position where the bottom portion of the second valve member 3 is placed on the spacer portion 2h formed around the edge of the first communicating hole 2b. Therefore, the second communicating portion 1b communicates with the first communicating portion 1a through the interior of the first valve member 2 passing through the first communicating hole 2b and the second communicating hole 2c to thereby secure the air flow between the canister and the fuel tank T.

In other words, when the internal pressure of the fuel tank T does not exceed the pressure level increased by the fueling, it is possible to always secure the airflow between the canister and the fuel tank T.

With such a configuration, it is possible to prevent hydrocarbon from releasing to the environment as little as possible. The hydrocarbon is included in a fuel gas (also referred as fuel steam) generated from the fuel inside the fuel tank T, and is said to have an adverse effect on the environment. However, the hydrocarbon easily permeates through a plastic. Therefore, it is difficult to completely keep the hydrocarbon inside the fuel tank T made of a resin. Also, it is difficult to completely stop the hydrocarbon from leaking through openings of connecters such as various types of pipes and tubes connected to the fuel tank T. Thus, it is preferred that the fuel tank T communicates with the canister to an extent in which no serious problem occurs.

When the internal pressure of the fuel tank T increases to a predetermined value due to the fueling, only the second valve member 3 rises to close the second communicating hole 2c by the upward pressure acting on the bottom of the second valve member 3 through the first communicating hole 2b, so that the canister does not communicate with the fuel tank T. When a fuel level in the fuel tank T reaches a predetermined level upon the fueling, a ventilation valve disposed separately from the valve blocks or reduces a ventilation path to thereby elevate the internal pressure of the fuel tank T. Accordingly, the fuel level in a filler tube (or filler neck) is elevated so that the sensor at a fueling nozzle (also called as fueling gun) detects the full tank. As mentioned above, when the pressure in the fuel tank T is elevated, the pressure control valve also blocks the communication between the canister and the fuel tank T. The pressure control valve does not impair the vent valve to detect the full tank.

When the internal pressure of the fuel tank T exceeds a predetermined value above the pressure level increased by the fueling, the second valve member 3 rises to close the second communicating hole 2c by the upward pressure acted on the bottom of the second valve member 3 through the first communicating hole 2b. The first valve member 2 also rises to open the second communicating portion 1b by the upward pressure acting on the bottom portion 2d of the first valve member 2 through the second communicating portion 1b, due to such a high pressure. Therefore, the canister communicates with the fuel tank T through the valve chamber 1.

It is possible to adjust a level of the upward pressure for raising the first valve member 2 by controlling a weight of the first valve member 2 and a size of the second communicating portion 1b. Also, It is possible to adjust a level of the upward pressure for raising the second valve member 3 by controlling a weight of the second valve member 3 and a size of the second communicating hole 2c.

For example, when the pressure in the fuel tank T becomes in a range of 133–266 Pa upon the fueling to the fuel tank T, the second valve member 3 is designed to elevate when the pressure in the fuel tank T becomes the pressure value in the above stated range.

Also, the first valve member 2 may be designed to elevate when the pressure in the fuel tank T becomes 3.60 kPa, so that the pressure in the fuel tank T can be maintained lower than 3.60 kPa.

The valve can be provided with such a pressure control function just by disposing the first valve member 2 with the second valve member 3 inside the valve chamber 1, thereby reducing the number of the parts.

As shown in FIG. 5, the second valve member 3 may be formed in a cylindrical shape with an opened bottom. The bottom portion of the second valve member 3 closes the first communicating hole 2b from the inside of the first valve member 2 when the second valve member is positioned at the lower position. Further, an airflow portion 3b may be formed for connecting the interior of the second valve member 3 to the interior of the first valve member 2.

With the configuration described above, when the internal pressure of the fuel tank T does not exceed the pressure level increased by the fueling, the first valve member 2 closes the second communicating portion 1b by its own weight from the inside of the valve chamber 1. The second valve member 3 closes the first communicating portion 2b by its own weight from the inside of the first valve member 2. The second communicating portion 1b communicates with the first communicating portion 1a through the interior of the first valve member 2 via the interior of the second valve member 3 connected to the first communicating hole 2b and the airflow portion 3b to thereby secure the air flow between the canister and the fuel tank T.

FIGS. 1 to 5 show the first embodiment wherein the valve described above is applied to a cut valve. The valve according to the embodiment includes a lower chamber 4 with a bottom of the valve chamber 1 as an upper wall thereof to be inserted into the fuel tank T.

The valve chamber 1 communicates with the lower chamber 4 through the second communicating portion 1b. A floating member 5 is disposed in the lower chamber 4. The floating member 5 forms a cut valve that rises to block the second communicating portion 1b from the lower chamber 4 side when the fuel flows into the lower chamber 4.

Thus, the valve can be provided with the pressure control function through the first valve member 2 and the second valve member 3, thereby reducing the number of the parts.

The cut valve according to the present embodiment is integrally provided with an upper portion 6 having the valve chamber 1 therein and a lower portion 7 constituting the lower chamber 4. Further, an outward flange 8 is disposed at a joining portion between the upper portion 6 and the lower portion 7. A projection 8a projecting downward is formed at an outer peripheral portion of the flange 8 for welding.

In the present embodiment, the lower portion 7 is inserted into an attaching hole Ta provided in the fuel tank T having a diameter smaller than an outer diameter of the flange 8 from the outside. Then, the projection 8a is welded to an outer surface surrounding the attaching hole Ta by heat, so that the valve is attached to the fuel tank T in a state that the attaching hole Ta is blocked by the flange 8.

In the present embodiment, the valve chamber 1 is formed of a concave portion 6a formed at the upper portion 6, and a cover plate 6b closes an opening portion of the concave portion in an airtight state.

The first communicating portion 1a is provided at a side of the valve chamber 1, and the second communicating portion 1b is provided at substantially the center of the bottom of the valve chamber 1.

Also, in the embodiment, the upper portion 6 is provided with a connecting pipe 6c projecting outward from a side of the upper portion 6. A base portion of the connecting pipe 6c constitutes the first communicating portion 1a. The connecting pipe 6c is inserted into a tube Pa through an end of the tube Pa to be connected to the canister, so that the canister communicates with the valve chamber 1 through the first communicating portion 1a.

The first valve member 2 is formed in a hollow member having a bottom portion 2d, a side portion 2e, and a ceiling portion 2f. In the present embodiment, the side portion 2e is integrated with the bottom portion 2d to thereby form a cup-shape member, and the ceiling portion 2f having a plate shape seals an opening portion of the cup-shape member in an airtight state.

A valve portion 2a has a cylindrical shape with two opening ends, and one end of the valve portion 2a is integrated with the bottom portion 2d of the first valve member 2 to project downward. The other end of the valve portion 2a communicates with the interior of the first valve member 2. In the present embodiment, the interior of the valve portion 2a forms the first communicating hole 2b. A hole of the second communicating portion 1b provided in the valve chamber 1 has a conical shape with an inner diameter gradually increasing upward. The valve portion 2a of the first valve member 2 is arranged to fit in the hole by a weight of the first valve member to thereby close the second communicating portion 1b from the valve chamber 1 side.

The first valve member 2 has vertical and horizontal dimensions slightly smaller than those of the valve chamber 1. Accordingly, when the first valve member 2 rises and the ceiling portion 2f thereof contacts an inner surface of the cover plate 6b of the upper portion 6 constituting the valve chamber 1, and the second valve member 3 rises to thereby close the second communicating hole 2c, the valve portion 2a moves out from the second communicating portion 1b, so that the first communicating portion 1a communicates with the second communicating portion 1b through a space between an outer surface of the side portion 2e of the first valve member 2 and an inner surface of the side portion of the valve chamber 1. Thus, the canister communicates with the fuel tank T. (Refer to FIG. 3)

A valve seat member 2j for the valve portion 3a of the second valve member 3 is formed at substantially the center of the upper portion of the first valve member 2. The valve seat member 2j has two opening ends, and an upper end thereof is integrated with an inner surface of the ceiling portion 2f of the first valve member 2, and a lower end thereof projects downward. The upper end of the valve seat member 2j communicates with the outside of the first valve member 2, i.e. valve chamber 1. In other words, in the example shown in the drawing, the second communicating hole 2c is formed of the valve seat member 2j for the valve portion 3a of the second valve member 3.

In the present embodiment, the second valve member 3 is formed in a cylindrical shape with a closed top end and an opening bottom end. The valve portion 3a projects upward at the upper portion of the second valve member 3. The second valve member 3 is disposed immediately above the first communicating hole 2b in a state that the bottom of the second valve member 3 is placed on the spacer portion 2h formed around the edge of the first communicating hole 2b by its own weight.

In the embodiment as shown in the drawings, the second valve member 3 is housed in the cylindrical member 2g projecting downward from the ceiling portion 2f of the first valve member 2. An inner wall of the cylindrical member 2g supports the second valve member at a lower position where the bottom thereof is placed on the spacer portion 2h. The inner wall of the cylindrical member 2g supports the valve portion 3a of the second valve member to fit in the valve seat member 2j from below at an upper position to thereby close the second communicating hole 2c.

The second valve member 3 has a vertical length shorter than a length between the upper end of the spacer portion 2h of the first valve member 2 and an inner surface of the ceiling portion 2f. At the lower position where the bottom of the second valve member 3 contacts the spacer portion 2h, the valve portion 3a of the second valve member 3 is positioned out of the valve seat member 2j, so that the canister communicates with the fuel tank through the first communicating hole 2b of the first valve member 2 at the lower position and the interior of the first valve member 2 (refer to FIG. 1).

The spacer portion 2h is formed of a plurality of rib-shape members 2i provided around the first communicating hole 2b, and the rib-shape members extend radially from the first communication hole at an inner surface of the bottom 2d of the first valve member 2. The rib-shape members 2i are formed with a space in between. Therefore, even when the second valve member 3 is placed on the spacer portion 2h at the lower position, the interior of the first valve member 2 communicates with the fuel tank T through the spaces and the first communicating hole 2b.

The lower portion 7 constituting the lower chamber 4 is formed in a cylindrical shape with an upper end thereof integrated with the upper portion 6 and a lower end thereof closed by a cover. Also, fuel in-flow ports 7a are formed in the lower portion 7 as needed.

A float member 5 constituting the cut valve is stored inside the lower chamber 4 to be movable vertically. A valve portion 5a with a shape of an upward projection is provided at an upper portion of the floating member 5 so that the valve portion 5a is inserted into a hole port portion on the lower chamber 4 of the second communicating portion 1b from the lower side when the floating member 5 rises to thereby prevent the fuel from entering through the second communicating portion 1b. A symbol 5b denotes a coil spring for urging the float member 5 upward when the fuel flows into the lower chamber 4. In addition, when the vehicle is tilted, the coil spring allows the float member 5 to rise to block the second communicating portion 1b from the lower chamber 4 side.

FIG. 6 shows the second embodiment as an example in which the valve is provided as the valve disposed in the ventilation path P between the canister and the fuel tank T outside the outer fuel tank T. In the embodiment, the valve chamber 1 is formed of a cup member 9 having a bottom portion 9a, side portion 9b, and cover plate 9c. The side portion 9b is integrated with the bottom portion 9a, and the cover plate 9c closes an upper opening in an airtight condition.

A connecting pipe 9d projecting outward is provided on the side portion 9b, and a base of the connecting pipe 9d is formed in the first communicating portion 1a. The connecting pipe 9d is inserted in the tube Pa connected to the canister from an end thereof, so that the canister communicates with the valve chamber 1 through the first communicating portion 1a.

In addition, a connecting pipe 9e projecting outward is provided on the bottom portion 9a, and a base of the connecting pipe 9e is formed in the second communicating portion 1b. The connecting pipe 9e is inserted in the tube Pb connected to the fuel tank T from an end thereof, so that the fuel tank T communicates with the valve chamber 1 through the second communicating portion 1b.

In the second embodiment, other structures and functions of the valve chamber 1, the first valve member 2, and the second valve member 3 are the same or substantially the same as those in the first embodiment. Therefore, the same symbols used for the first embodiment in FIGS. 1 to 3 are used for the same or substantially the same structural components of the second embodiment in FIG. 6, and the explanations are omitted.

According to the present invention, when the inside of the fuel tank reaches a certain high pressure state, or a certain low pressure state, the pressure control valve for the fuel tank opens appropriately to secure the communication between the canister and fuel tank. Further, the pressure control valve of the invention is formed of a minimal number of the parts.

While the invention has been explained with reference to the specific embodiments of the invention, the explanation is illustrative and the invention is limited only by the appended claims.

What is claimed is:

1. A pressure control valve, comprising:
   a valve chamber having a first communicating portion to communicate with a canister and a second communicating portion to communicate with a fuel tank,
   a first valve member having a hollow body and disposed inside the valve chamber to be movable between a lower position and an upper position, said first valve member including a first valve portion at a bottom thereof for closing the second communicating portion from an inside of the valve chamber at the lower position, a first communicating hole passing through the first valve portion, and a second communicating hole formed at an upper portion thereof for communication between the first valve member and the valve chamber, and
   a second valve member disposed inside the first valve member to be movable between a lower position and an upper position, said second valve member having a second valve portion for closing the second communicating hole from an inside of the first valve member at the upper position thereof, and means for providing a space to the second valve member so that when the second valve member is located at the lower position above the first communicating hole, an inside of the first valve member communicates with the first communicating hole.

2. A pressure control valve according to claim 1, wherein said first and second valve members are arranged so that when an inner pressure applied to the second communicating portion becomes above a predetermined high level, the second valve member rises to close the second communicating hole, and when the inner pressure further increases and exceeds a predetermined pressure level, the first valve member rises to open the second communicating portion.

3. A pressure control valve according to claim 1, wherein said means for providing a space is a spacer deposited around the first communicating hole inside the first valve member.

4. A pressure control valve according to claim 1, wherein said means for providing a space is a hole formed in the second valve member.

5. A pressure control valve according to claim 1, wherein said second communicating portion has an upper portion formed in a cone shape for receiving the first valve portion, and said first valve member has a portion formed in a cone shape around the second communicating hole for receiving the second valve portion.

6. A pressure control valve according to claim 1, further comprising a lower chamber disposed below the valve chamber and communicating with the valve chamber through the second communicating portion, and a float member situated in the lower chamber so that when a fuel flows into the lower chamber, the float member rises to close the second communicating portion from a lower chamber side.

7. A pressure control valve according to claim 6, further comprising a flange portion at an upper periphery of the lower chamber to be welded onto an outer surface of the fuel tank.

8. A pressure control valve according to claim 7, further comprising a coil spring disposed in the lower chamber for urging the float member upward.

* * * * *